US011560182B2

(12) United States Patent
Keller et al.

(10) Patent No.: US 11,560,182 B2
(45) Date of Patent: Jan. 24, 2023

(54) LOCK UNIT FOR TAILGATE SYNCHRONIZER

(71) Applicant: GECOM Corporation, Greensburg, IN (US)

(72) Inventors: Peter O. Keller, Novi, MI (US); Anil K. Jain, Novi, MI (US)

(73) Assignee: GECOM Corporation, Greensburg, IN (US)

( * ) Notice: Subject to any disclaimer, the term of this patent is extended or adjusted under 35 U.S.C. 154(b) by 537 days.

(21) Appl. No.: 16/587,517

(22) Filed: Sep. 30, 2019

(65) Prior Publication Data

US 2021/0094629 A1    Apr. 1, 2021

(51) Int. Cl.
| | | |
|---|---|---|
| B62D 33/037 | (2006.01) |
| E05B 85/10 | (2014.01) |
| E05B 79/20 | (2014.01) |
| E05B 81/16 | (2014.01) |
| B62D 33/027 | (2006.01) |
| E05B 81/76 | (2014.01) |

(52) U.S. Cl.
CPC ....... B62D 33/037 (2013.01); B62D 33/0273 (2013.01); E05B 79/20 (2013.01); E05B 81/16 (2013.01); E05B 81/76 (2013.01); E05B 85/10 (2013.01); *E05Y 2900/546* (2013.01)

(58) Field of Classification Search
CPC ... B62D 33/037; B62D 33/0273; E05B 79/20; E05B 81/16; E05B 81/76; E05B 85/10; E05Y 2900/546
See application file for complete search history.

(56) References Cited

U.S. PATENT DOCUMENTS

| | | |
|---|---|---|
| 2,877,038 A | 3/1959 | Kramer |
| 3,384,404 A | 5/1968 | Slattery |
| 3,387,406 A | 6/1968 | Coker et al. |
| 3,400,961 A | 9/1968 | Koch et al. |
| 3,409,321 A | 11/1968 | Wolfslayer |
| 3,454,299 A | 7/1969 | Hewitt et al. |
| 3,567,274 A | 3/1971 | Kaptur, Jr. et al. |
| 3,592,504 A | 7/1971 | Sandor |
| 3,623,764 A | 11/1971 | Jacobus |
| 3,645,043 A | 2/1972 | Velavicius et al. |
| 3,692,343 A | 9/1972 | Meyer |
| 3,749,440 A | 7/1973 | Lathers |
| 3,998,482 A | 12/1976 | Nazaki et al. |
| 4,076,301 A | 2/1978 | Gergoe |
| 4,157,844 A | 6/1979 | Sarosy et al. |
| 5,040,390 A | 8/1991 | Mistry et al. |
| 5,265,450 A | 11/1993 | Doyle |
| 5,433,039 A | 7/1995 | Hawkins et al. |
| 5,556,152 A | 9/1996 | Dunlap et al. |

(Continued)

FOREIGN PATENT DOCUMENTS

DE    102011004832 A1  *  8/2012  .........  E05B 47/0009

*Primary Examiner* — Kristina R Fulton
*Assistant Examiner* — James Edward Ignaczewski
(74) *Attorney, Agent, or Firm* — Barnes & Thornburg LLP

(57) ABSTRACT

A latch system for a vehicle includes a synchronizer and a lock unit. The synchronizer is configured to block and allow release of a number of latches of the vehicle such that some latches are blocked from being released if other latches are already released. The lock unit is configured to block selectively the release of the number of latches.

17 Claims, 12 Drawing Sheets

(56) References Cited

U.S. PATENT DOCUMENTS

| | | | |
|---|---|---|---|
| 7,201,422 B2* | 4/2007 | Plett | B60P 1/26 |
| | | | 296/51 |
| 7,481,479 B1 | 1/2009 | Townson et al. | |
| 7,690,710 B2* | 4/2010 | Townson | E05D 15/52 |
| | | | 296/57.1 |
| 8,061,753 B2* | 11/2011 | Papanikolaou | B62D 33/037 |
| | | | 296/51 |
| 8,720,956 B2 | 5/2014 | Murray | |
| 2011/0140461 A1* | 6/2011 | Murray | E05B 83/16 |
| | | | 292/137 |

* cited by examiner

LOCK UNIT FOR TAILGATE SYNCHRONIZER

FIELD OF THE DISCLOSURE

The present disclosure relates generally to vehicle latch systems, and more specifically to latch systems for use with dual-mode tailgates. It is to be appreciated that the present disclosure may relate to other vehicle latch applications.

BACKGROUND

Vehicles may include latching devices such as, for example, doors, hoods, tailgates, etc. Some vehicles include latch systems that are configured to release more than one latch. As one example, dual-mode tailgates are configured to open selectively in a fold-down mode or a side-swing mode. In the fold-down mode, a first set of latches are released and the dual-mode tailgate rotates about a horizontal axis relative to the vehicle. In the side-swing mode, a second set of latches are released and the dual-mode tailgate rotates about a vertical axis relative to the vehicle.

A synchronizer may be used with dual-mode tailgates to block a user from releasing both the first set of latches and the second set of latches at the same time so that the dual-mode tailgate remains supported by one of the sets of latches. It may be desirable to block both the first set of latches and the second set of latches from being released to lock the dual-mode tailgate and prevent the tailgate from being opened in either mode.

SUMMARY

The present disclosure may comprise one or more of the following features and combinations thereof.

According to an aspect of the present disclosure, a latch system for a vehicle may include a tailgate, a synchronizer, and a lock unit. The tailgate may include a tailgate frame, a first latch coupled with the tailgate frame, a second latch coupled with the tailgate frame, a third latch coupled with the tailgate frame, an upper handle coupled with the tailgate frame and configured to pivot relative to the tailgate frame, and a lower handle coupled with the tailgate frame and configured to pivot relative to the tailgate frame. The synchronizer may be coupled with the tailgate and may be configured to block and allow release of the first latch, the second latch, and the third latch. The synchronizer may have an enabled arrangement in which the synchronizer is configured to i) release the first latch and the third latch in response to a user pulling the upper handle to allow the tailgate to rotate about a first axis, ii) release the second latch and the third latch in response to the user pulling the lower handle to allow the tailgate to rotate about a second axis perpendicular to the first axis, and iii) block more than two latches of the first latch, the second latch, and the third latch from being released at a given time.

The lock unit may be coupled with the synchronizer and may be configured to move selectively the synchronizer between the enabled arrangement and a disabled arrangement. In the disabled arrangement, the synchronizer may allow the upper handle and the lower handle to pivot relative to the tailgate frame without the synchronizer releasing any of the first latch, the second latch, and the third latch in response to the user pulling one of the upper handle and the lower handle.

In some embodiments, the lock unit may include an actuator, a first clasp arm coupled with the actuator, and a second clasp arm coupled with the first clasp arm. The second clasp arm may be configured to rotate in response to rotation of the first clasp arm. The actuator may be configured to rotate the first clasp arm about an axis to move the lock unit between an unlocked configuration in which the first clasp arm and the second clasp arm cooperate to maintain the synchronizer in the enabled arrangement and a locked configuration in which the first clasp arm and the second clasp arm cooperate to maintain the synchronizer in the disabled arrangement.

In some embodiments, the synchronizer may include a mount, a first release assembly coupled with the mount, the first latch, the third latch, and the upper handle, and a second release assembly coupled with the mount, the second latch, the third latch, and the lower handle. The first release assembly may be configured to release the first latch and the third latch in response to the user pulling the upper handle. The second release assembly may be configured to release the second latch and the third latch in response to the user pulling the lower handle.

In some embodiments, the first clasp arm may engage the first release assembly and the second clasp arm may engage the second release assembly. The first clasp arm may disable the first release assembly such that pulling the upper handle does not release the first latch and the third latch in response to the lock unit being in the locked configuration. The second clasp arm may disable the second release assembly such that pulling the lower handle does not release the second latch and the third latch in response to the lock unit being in the locked configuration.

In some embodiments, the lock unit may include a manual release coupled with the first clasp arm. The manual release may be configured to rotate the first clasp arm in response to the user activating the manual release to move the lock unit from the locked configuration to the unlocked configuration.

In some embodiments, the manual release includes a cable. The cable may be coupled with the tailgate frame and with the first clasp arm.

In some embodiments, the synchronizer may include a mount and a first release assembly. The first release assembly may include a first latch-actuator lever connected with the first latch, a first handle lever coupled with the upper handle and configured to move relative to the mount in response to the user pulling the upper handle, and a first sensor unit. The first sensor unit may be movable between an unlocked arrangement in which the first sensor unit transmits force from the first handle lever to the first latch-actuator lever to move the first latch-actuator lever in response to the user pulling the upper handle to release the first latch and a locked arrangement in which the first sensor unit does not transmit force from the first handle lever to the first latch-actuator lever in response to the user pulling the upper handle.

In some embodiments, the lock unit may include a first clasp arm and an actuator. The first clasp arm may be engaged with the first sensor unit. The first clasp arm may be configured to rotate about an axis to move the first sensor unit between the locked and unlocked arrangements. The actuator may be coupled with the first clasp arm and may be configured to rotate the first clasp arm about the axis in response to receiving inputs.

In some embodiments, the first sensor unit may include a sensor lever formed to define a slot therein and a pin received in the slot. The pin maybe movable in the slot between a first position in which the pin is engagable by the first handle lever and a second position in which the pin is not engagable by the first handle lever.

According to another aspect of the present disclosure, a latch system for a vehicle may include a synchronizer and a lock unit. The synchronizer may include a mount, a first release assembly coupled with the mount and movable relative to the mount, and a second release assembly coupled with the mount and movable relative to the mount. The first release assembly may be configured to release a first latch in response to activation of the first release assembly. The second release assembly may be configured to release a second latch in response to activation of the second release assembly. The synchronizer may be configured to block activation of one of the first release assembly and the second release assembly when the other of the first release assembly and the second release assembly is already activated.

The lock unit may be coupled with the synchronizer and engaged with the first release assembly and the second release assembly. The lock unit may be configured to block selectively activation of any of the first release assembly and the second release assembly.

In some embodiments, the lock unit may be movable between a locked configuration and an unlocked configuration. The lock unit may include a first clasp arm and a second clasp arm. The first clasp arm may block activation of the first release assembly and the second clasp arm may block activation of the second release assembly in response to the lock unit being in the locked configuration. The first clasp arm may allow activation of the first release assembly and the second clasp arm may allow activation of the second release assembly in response to the lock unit being in the unlocked configuration.

In some embodiments, the first clasp arm may be rotatably coupled with the mount. The second clasp arm may be rotatably coupled with the mount. The first clasp arm may be coupled with the second clasp arm such that rotation of the first clasp arm relative to the mount causes rotation of the second clasp arm.

In some embodiments, the lock unit may include an actuator. The actuator may be configured to rotate the first clasp arm in response to receiving an input to move the lock unit between the locked configuration and the unlocked configuration.

In some embodiments, the lock unit may include a manual release coupled with the first clasp arm. The manual release may be configured to rotate the first clasp arm relative to the mount to move the lock unit from the locked configuration to the unlocked configuration in response to a user manually activating the manual release.

In some embodiments, the first release assembly may include a first latch-actuator lever, a first sensor unit, and a first handle lever. The first latch-actuator lever may be configured to be connected with the first latch such that rotation of the first latch-actuator lever relative to the mount releases the first latch. The first sensor unit may be movable between an unlocked arrangement and a locked arrangement. The first handle lever may be i) configured to apply a force to the first latch-actuator lever through the first sensor unit to cause the first latch-actuator lever to rotate and release the first latch in response to the first sensor unit being in the unlocked arrangement and the first release assembly being activated and ii) configured to not apply the force to the first latch-actuator lever through the first sensor unit in response to the first sensor unit being in the locked arrangement and the first release assembly being activated. The lock unit may be configured to move selectively the first sensor unit between the unlocked arrangement and the locked arrangement.

In some embodiments, the second release assembly may include a second latch-actuator lever, a second sensor unit, and a second handle lever. The second latch-actuator lever may be configured to be connected with the second latch such that rotation of the second latch-actuator lever relative to the mount releases the second latch. The second sensor unit may be movable between an unlocked arrangement and a locked arrangement. The second handle lever may be i) configured to apply a force to the second latch-actuator lever through the second sensor unit to cause the second latch-actuator lever to rotate and release the second latch in response to the second sensor unit being in the unlocked arrangement and the second release assembly being activated and ii) configured to not apply the force to the second latch-actuator lever through the second sensor unit in response to the second sensor unit being in the locked arrangement and the second release assembly being activated. The lock unit may be configured to move selectively the second sensor unit between the unlocked arrangement and the locked arrangement simultaneously with movement of the first sensor unit between the unlocked arrangement and the locked arrangement.

In some embodiments, the first sensor unit may include a first sensor lever and a first pin. The first sensor lever may be formed to define a first slot therein. The first pin may extend into the first slot and may be configured to translate in the first slot between a first position in which the first pin is engagable by the first handle lever and a second position in which the first pin is not engagable by the first handle lever. The first sensor lever may be pivotably coupled with the mount and may be coupled with the first pin. The first sensor lever may be configured to move the first pin between the first position and the second position. The lock unit may be configured to selectively move the first sensor lever between the locked arrangement and the unlocked arrangement.

In some embodiments, the lock unit may include a first clasp arm and a second clasp arm. The first clasp arm may have a first leg that extends radially from a first axis and a second leg that extends radially and circumferentially away from the first axis and engages the first release assembly. The second clasp arm may have a first leg that extends radially away from a second axis and may be coupled with the first leg of the first clasp arm at a pivot joint and a second leg that extends radially and circumferentially away from the second axis and engages the second release assembly.

According to another aspect of the present disclosure, a method may include a number of steps. The method may include providing a tailgate adapted to rotate about a first axis in a fold-down mode and to rotate about a second axis in a side-swing mode, the tailgate including a first latch, a second latch, a first handle connected with the first latch, and a second handle connected with the second latch, allowing release of the first latch in response to activation of the first handle or release of the second latch in response to activation of the second handle, releasing the first latch in response to activation of the first handle, blocking release of the second latch while the first latch is released, latching the first latch, and blocking release of both the first latch and the second latch in response to activation of either the first handle and the second handle while allowing a full range of motion of the first handle and the second handle.

In some embodiments, the method includes providing a synchronizer coupled with the tailgate and a lock unit connected with the synchronizer. The synchronizer may be configured to block release of one of the first latch and the second latch while the other of the first latch and the second latch is released. The lock unit may be configured to block selectively the synchronizer from allowing release of both or either of the first latch and the second latch.

These and other features of the present disclosure will become more apparent from the following description of the illustrative embodiments.

DETAILED DESCRIPTION OF THE DRAWINGS

Figure 1:
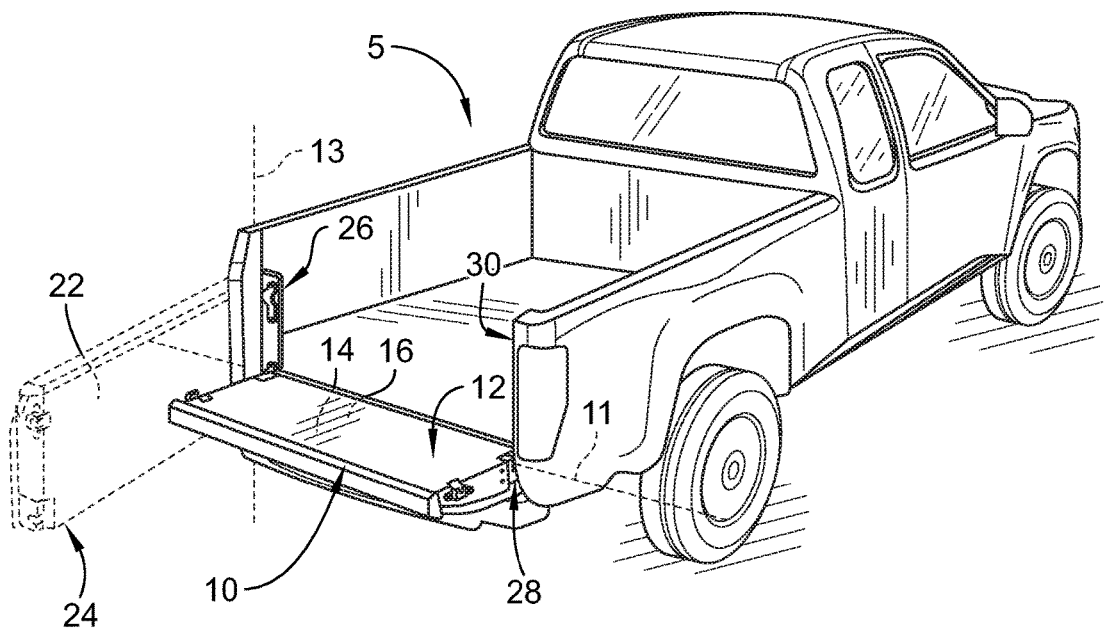
FIG. 1 is a perspective view of a vehicle having a latch system in accordance with the present disclosure, the vehicle being a truck having a body and the latch system including a dual-mode tailgate coupled with the body of the truck and configured to open selectively in a fold-down mode and a side-swing mode.

For the purposes of promoting an understanding of the principles of the disclosure, reference will now be made to a number of illustrative embodiments illustrated in the drawings and specific language will be used to describe the same.

Figure 2:
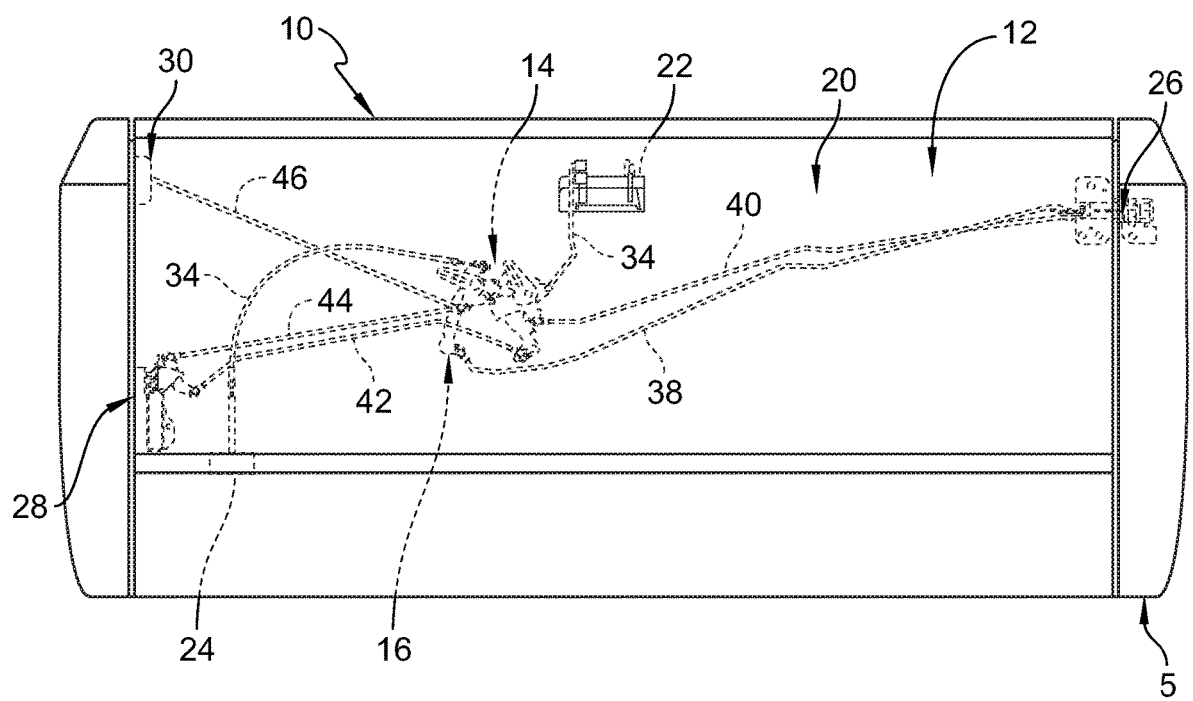
FIG. 2 is an elevation view of the latch system of FIG. 1 showing that the latch system includes the dual-mode tailgate, a synchronizer configured to allow the dual-mode tailgate to open in only one of the modes at a given time in response to a user activating one of the tailgate's handles, and a lock unit configured to lock the synchronizer so that the dual-mode tailgate is blocked from opening in either mode without limiting the range of motion of the tailgate's handles.

A latch system 10 in accordance with the present disclosure and adapted for use with a vehicle 5 such as, for example, a truck, car, SUV, van, etc. is shown in FIGS. 1 and 2. The latch system 10 includes a dual-mode tailgate 12, a synchronizer 14, and a lock unit 16. The dual-mode tailgate 12 is configured to move selectively relative to the vehicle 5 in a fold-down mode or a side-swing mode as suggested in FIG. 1. The synchronizer 14 is coupled with the tailgate 12 and blocks the tailgate 12 from opening in both the fold-down mode and the side-swing mode at the same time. The lock unit 16 is coupled with the synchronizer 14 and configured to lock the synchronizer 14 so that the dual-mode tailgate 12 is blocked from opening in either the fold-down mode or the side-swing mode while still allowing handles 22, 24 included in the tailgate 12 to have a full range of motion when pulled by a user.

Figure 5:
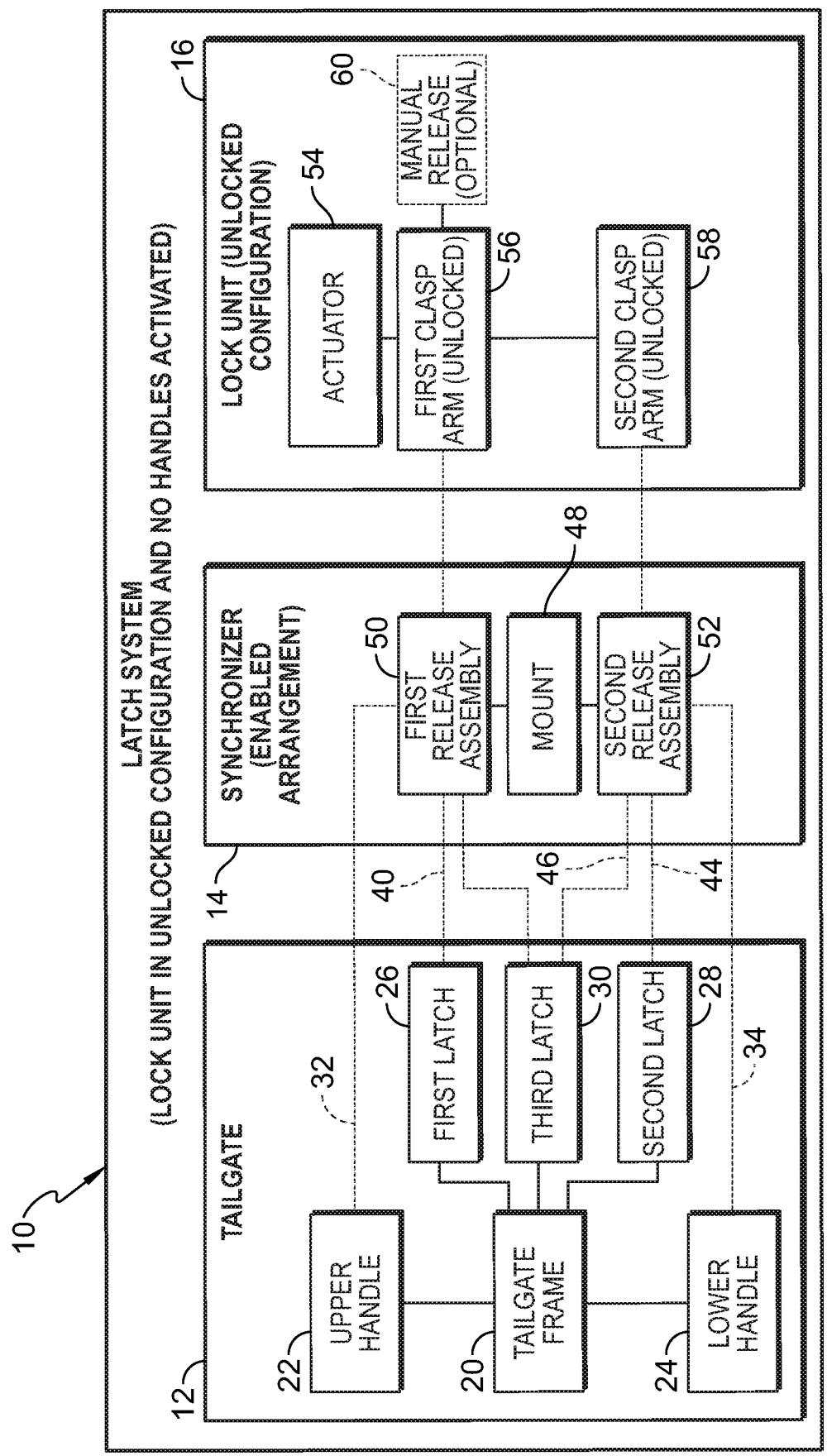
FIG. 5 is a diagrammatic view of the latch system of FIG. 2 showing the lock unit in the unlocked configuration and no handles activated such that the tailgate is latched with the body of the vehicle and held in position relative to the body of the vehicle.

The tailgate 12 includes a tailgate frame 20, the upper handle 22, the lower handle 24, a first latch 26, a second latch 28, and a third latch 30 as shown in FIGS. 2 and 5. The first latch 26, second latch 28, and third latch 30 are coupled with the tailgate frame 20 and configured to couple selectively the latch system 10 with the vehicle 5. The upper handle 22 and the lower handle 24 are coupled with the tailgate frame 20 and configured to pivot relative to the tailgate frame 20.

The synchronizer 14 is configured to block and allow release of the first latch 26, the second latch 28, and the third latch 30 to allow movement of the tailgate 12 in one of the fold-down and the side-swing modes as suggested in FIGS. 1 and 2. The synchronizer 14 has an enabled arrangement in which the tailgate 12 can be moved in either mode and a disabled arrangement in which the synchronizer blocks the tailgate 12 from moving in either mode as suggested in FIGS. 5 and 11. The lock unit 16 is configured to move selectively the synchronizer 14 between the enabled arrangement and the disabled arrangement as suggested in FIGS. 5 and 11. As a result, the lock unit 16 can lock the synchronizer 14 so that the tailgate 12 is held in position relative to the vehicle 5 and not movable in the fold-down or side-swing mode.

In the enabled arrangement, the synchronizer 14 is configured to i) release the first latch 26 and the third latch 30 in response to a user pulling the upper handle 22 to allow the tailgate 12 to rotate about a first axis 11 in the fold-down mode ii) release the second latch 28 and the third latch 30 in response to a user pulling the lower handle 24 to allow the tailgate 12 to rotate about a second axis 13 in the side-swing mode, and iii) block more than two latches of the first latch 26, the second latch 28, and the third latch 30 from being released at a given time so that the tailgate 12 can move only in either the fold-down mode or the side-swing mode.

Some users may expect tailgate and door handles to rotate with their full range of motion at all times, even if the tailgate or door is locked. In the disabled arrangement, the synchronizer 14 allows the upper handle 22 and the lower handle 24 to rotate relative to the tailgate frame 20 without the synchronizer 14 releasing any of the first latch 26, the second latch 28, and the third latch 30 in response to the user pulling one of the upper handle 22 and the lower handle 24 while allowing the upper handle 22 and the lower handle 24 to have full range of motion. The full range of motion of the upper handle 22 and the lower handle 24 of the present disclosure may reduce user injuries when interfacing with the latch system 10 even when the latch system 10 is locked.

Additionally, some fixed-while-locked handles may be prone to unlock in response to brute force actuation (pulling very hard) on the handle because the handle remains mechanically linked to its latch. The release assemblies 50, 52 of the synchronizer 14 of the latch system 10 are disabled when the lock unit 16 is locked. As such, the handles 22, 24 are not mechanically linked to the latches 26, 28, 30 when the lock unit 16 is locked so that the latch system 10 may be less prone to brute force actuation.

As discussed above, the dual-mode tailgate 12 includes the tailgate frame 20, the upper handle 22 (first handle), the lower handle 24 (second handle), the first latch 26, the second latch 28, and the third latch 30 as shown in FIGS. 2 and 5. The tailgate frame 20 extends between first and second lateral sides of the vehicle 5 and blocks access into a bed of the vehicle 5, trunk, or other storage space as suggested in FIG. 1. The handles 22, 24 are coupled with the tailgate frame 20 and configured to be pulled by a user to unlatch the tailgate 12 for movement relative to the vehicle 5 as suggested in FIG. 5. The latches 26, 28, 30 are coupled with the tailgate frame 20 and are configured to couple and uncouple selectively with vehicle 5 to hold the tailgate 12 in position relative to the vehicle 5 or to allow the tailgate to move relative to the vehicle 5 in the fold-down or side-swing modes as suggested in FIGS. 1 and 5.

Figure 7:
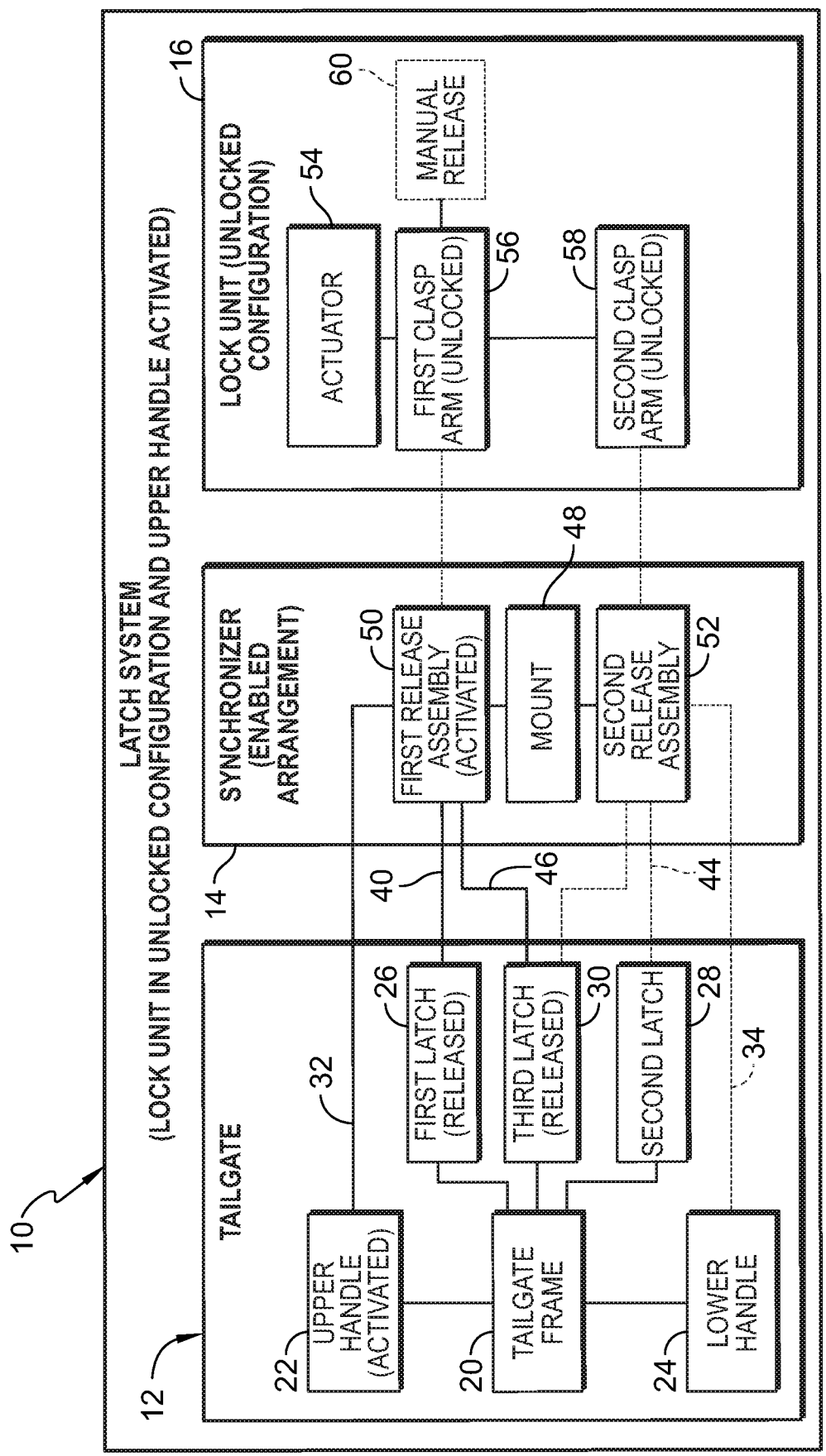
FIG. 7 is a diagrammatic view of the latch system of FIG. 2 showing the lock unit in the unlocked configuration and that an upper handle of the tailgate is activated to cause a first release assembly of the synchronizer to be activated and unlatch a first latch and a third latch of the tailgate so that the tailgate can open in the fold-down mode.
Figure 8:
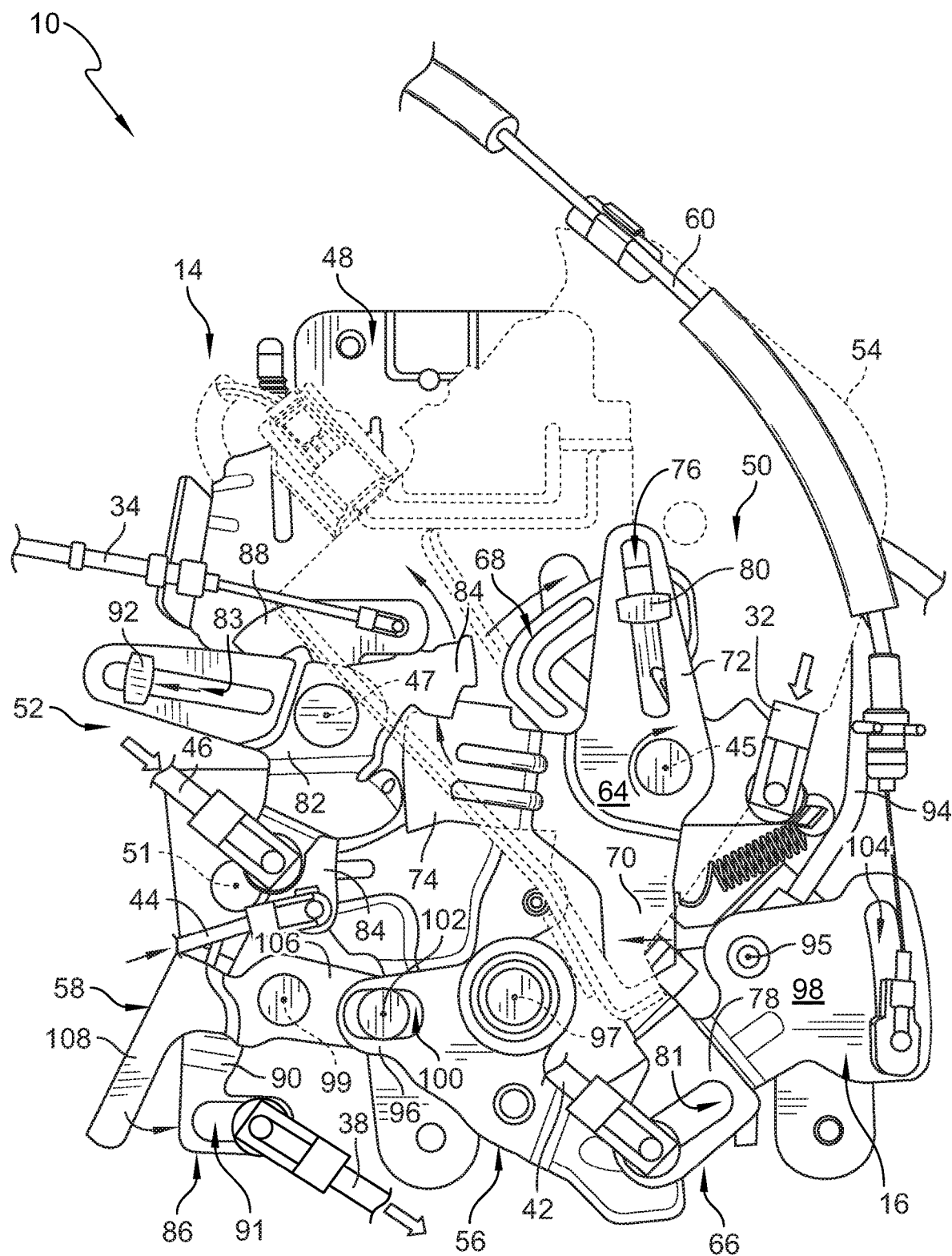
FIG. 8 is a front elevation view of the synchronizer and lock unit arranged as in FIG. 7 showing the lock unit in the unlocked configuration and the first release assembly of the synchronizer activated in response to the upper handle of the tailgate being pulled by a user.

The upper handle 22 is configured to rotate relative to the tailgate frame 20 in response to the user pulling the upper handle 22 to unlatch the tailgate 12 for movement in the fold-down mode as suggested in FIGS. 1, 7, and 8. The upper handle 22 is connected to the first release assembly 50 of the synchronizer 14 through a first actuator link 32. The upper handle 22 is free to rotate in its full range of motion even when the lock unit 16 is locked and the synchronizer 14 is disabled. In the illustrative embodiment, the upper handle 22 is coupled to the tailgate frame 20 at about a lateral midsection of the tailgate frame 20 and a little above a vertical midsection of the tailgate frame 20. The upper handle 22 may be located in other positions relative to the tailgate frame 20 or door frame in other embodiments. The first actuator link 32 includes a rod 32 in the illustrative embodiment as shown in FIG. 2.

Figure 9:
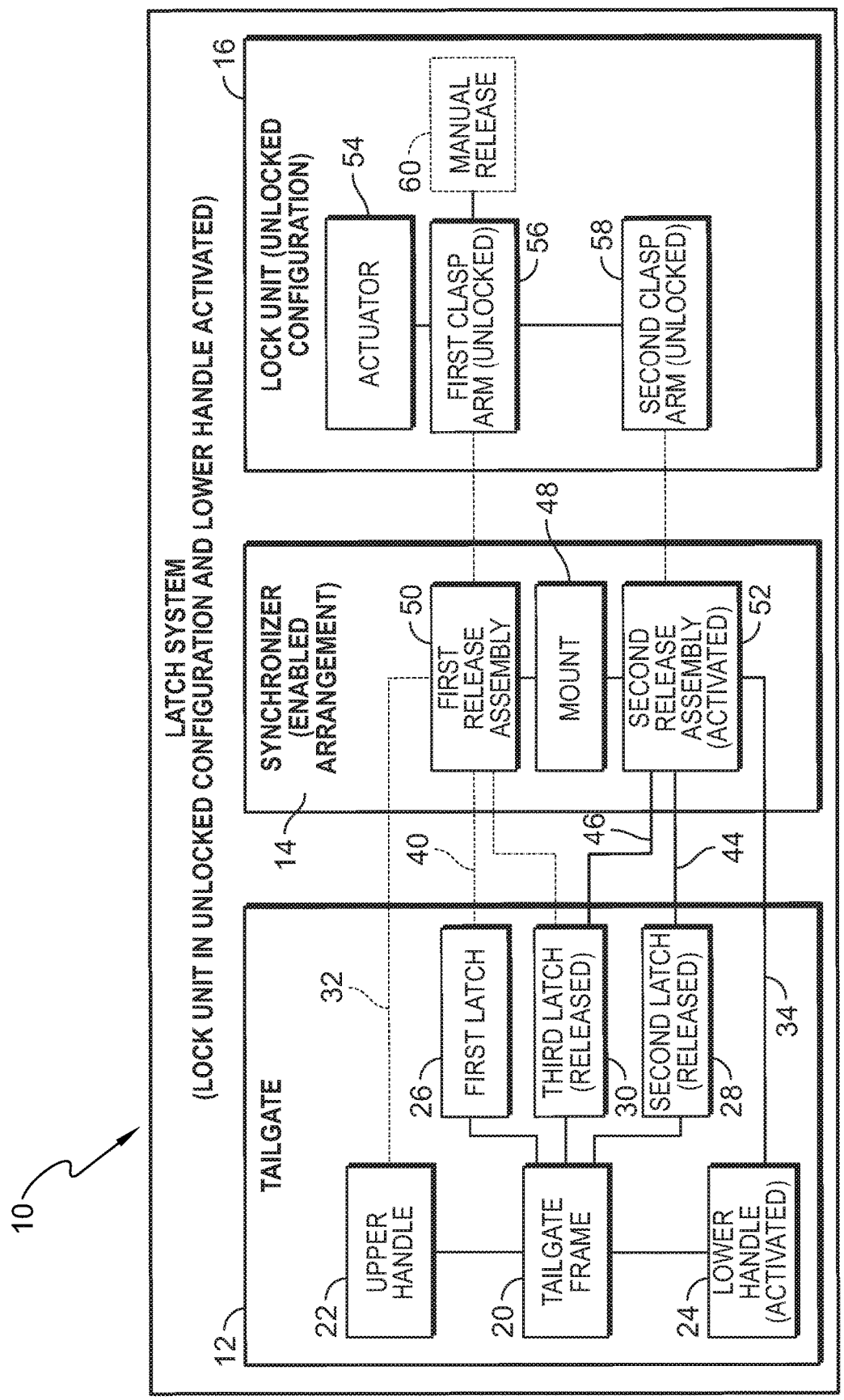
FIG. 9 is a diagrammatic view of the latch system of FIG. 2 showing the lock unit in the unlocked configuration and that a lower handle of the tailgate is activated to cause a second release assembly of the synchronizer to be activated and unlatch a second latch and the third latch of the tailgate so that the tailgate can open in the side-swing mode.
Figure 10:
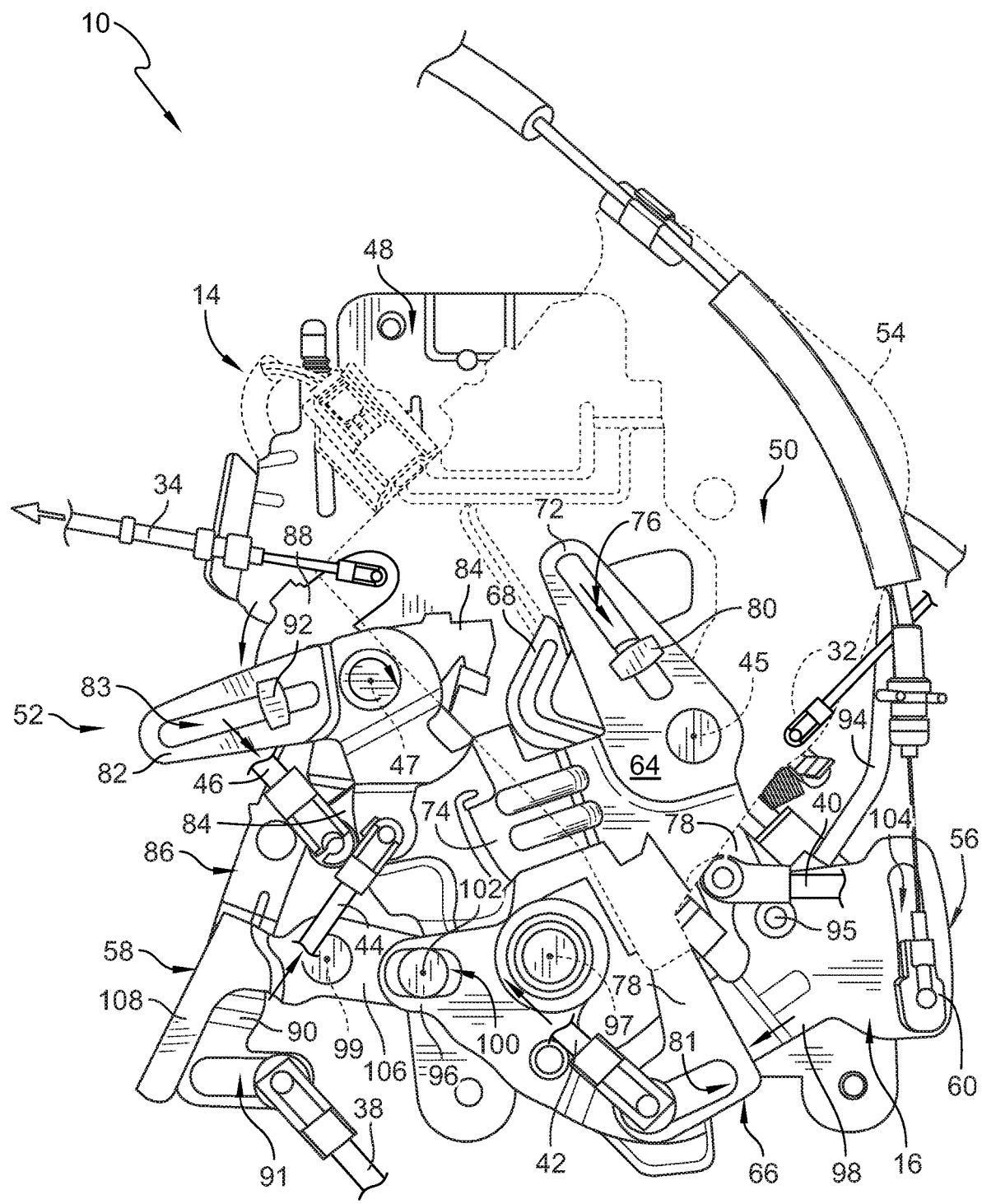
FIG. 10 is a front elevation view of the synchronizer and lock unit arranged as in FIG. 9 showing the lock unit in the unlocked configuration and the second release assembly of the synchronizer activated in response to the lower handle of the tailgate being pulled by a user.

The lower handle 24 is configured to rotate relative to the tailgate frame 20 in response to the user pulling the lower handle 24 to unlatch the tailgate 12 for movement in the side-swing mode as suggested in FIGS. 1, 9, and 10. The lower handle 24 is connected to the second release assembly 52 of the synchronizer 14 through a second actuator link 34. The lower handle 24 is free to rotate in its full range of motion even when the lock unit 16 is locked and the synchronizer 14 is disabled. In the illustrative embodiment, the lower handle 24 is coupled to an underside of the tailgate frame 20 laterly offset toward the passenger's side of the tailgate frame 20 as suggested in FIG. 2. The lower handle 24 may be located in other positions relative to the tailgate frame 20 or door frame in other embodiments. The second actuator link 34 includes a cable 34 in the illustrative embodiment as shown in FIG. 2.

The tailgate 12 is coupled with the vehicle 5 through three hinge joints as suggested in FIG. 2. Two of the three hinge joints may be uncoupled from the vehicle 5 at a time to allow the tailgate 12 to move relative to the vehicle 5. The first latch 26 is located at an upper end of the tailgate frame 20 and couples with the vehicle 5 on the first (driver's) side of the vehicle 5 to form a hinged joint as shown in FIG. 2. The first latch 26 is connected to the first release assembly 50 via a first actuator rod 40 and connected to the second release assembly 52 via a first sensor rod 38.

The second latch 28 is located at a lower end of the tailgate frame 20 and coupled with the vehicle 5 on the second (passenger's) side of the vehicle 5 to form a hinged joint as shown in FIG. 2. The second latch 28 is connected to the second release assembly 52 via a second actuator rod 44 and connected to the first release assembly 50 via a second sensor rod 42. The third latch 30 is located at the upper end of the tailgate frame 20 and coupled with the vehicle 5 on the second (passenger's) side of the vehicle 5 to form a hinged joint. The third latch 30 is connected to the second release assembly 52 via a third actuator rod 46.

Figure 11:
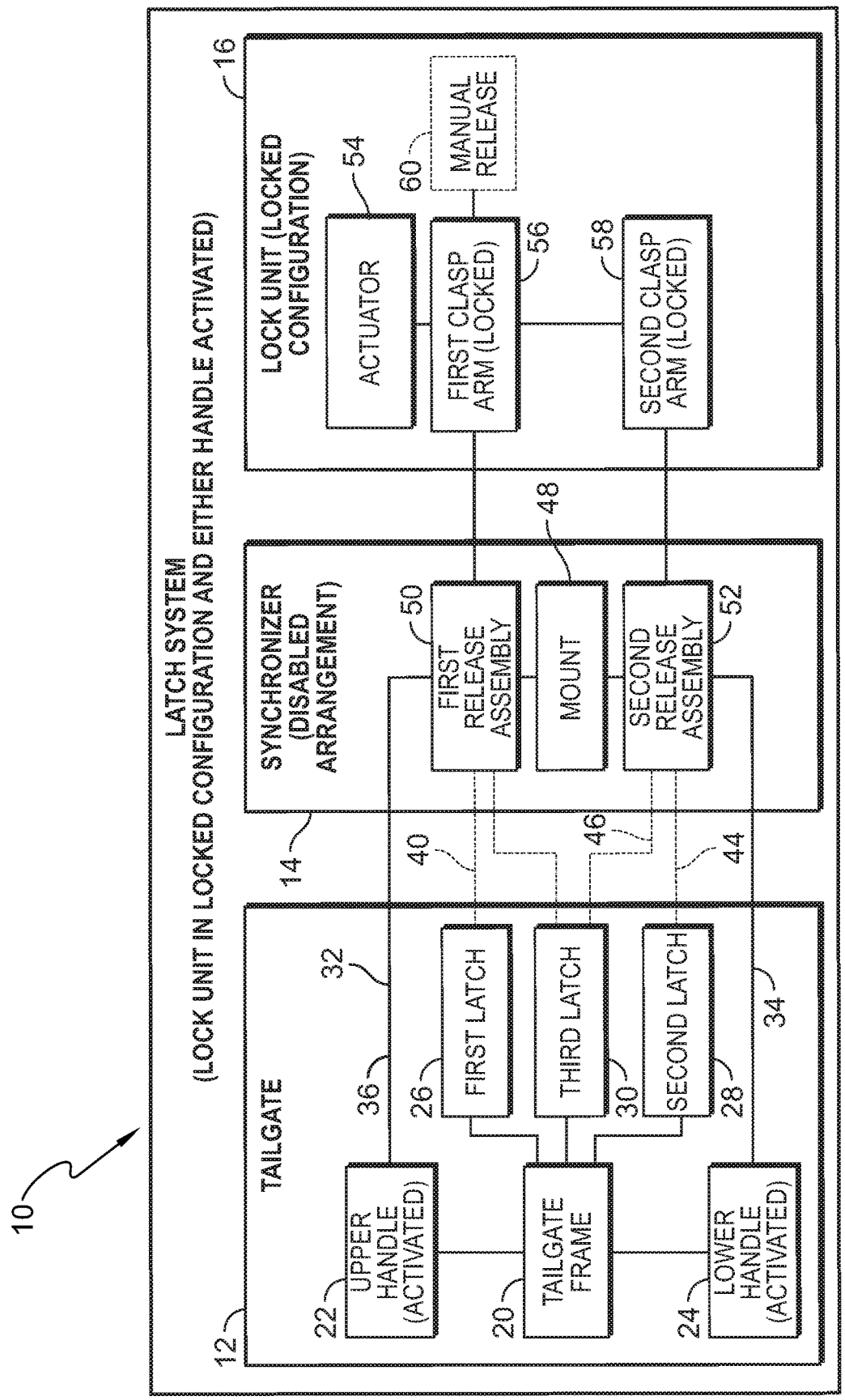
FIG. 11 is a diagrammatic view of the latch system of FIG. 2 showing the lock unit in the locked configuration which disables the first and second release assemblies of the synchronizer and further suggesting that a user pulling either the upper handle or the lower handle allows the handles to move and activate, but that the synchronizer does not release any latches so that the tailgate remains locked and held in position relative to the body of the vehicle.
Figure 12:
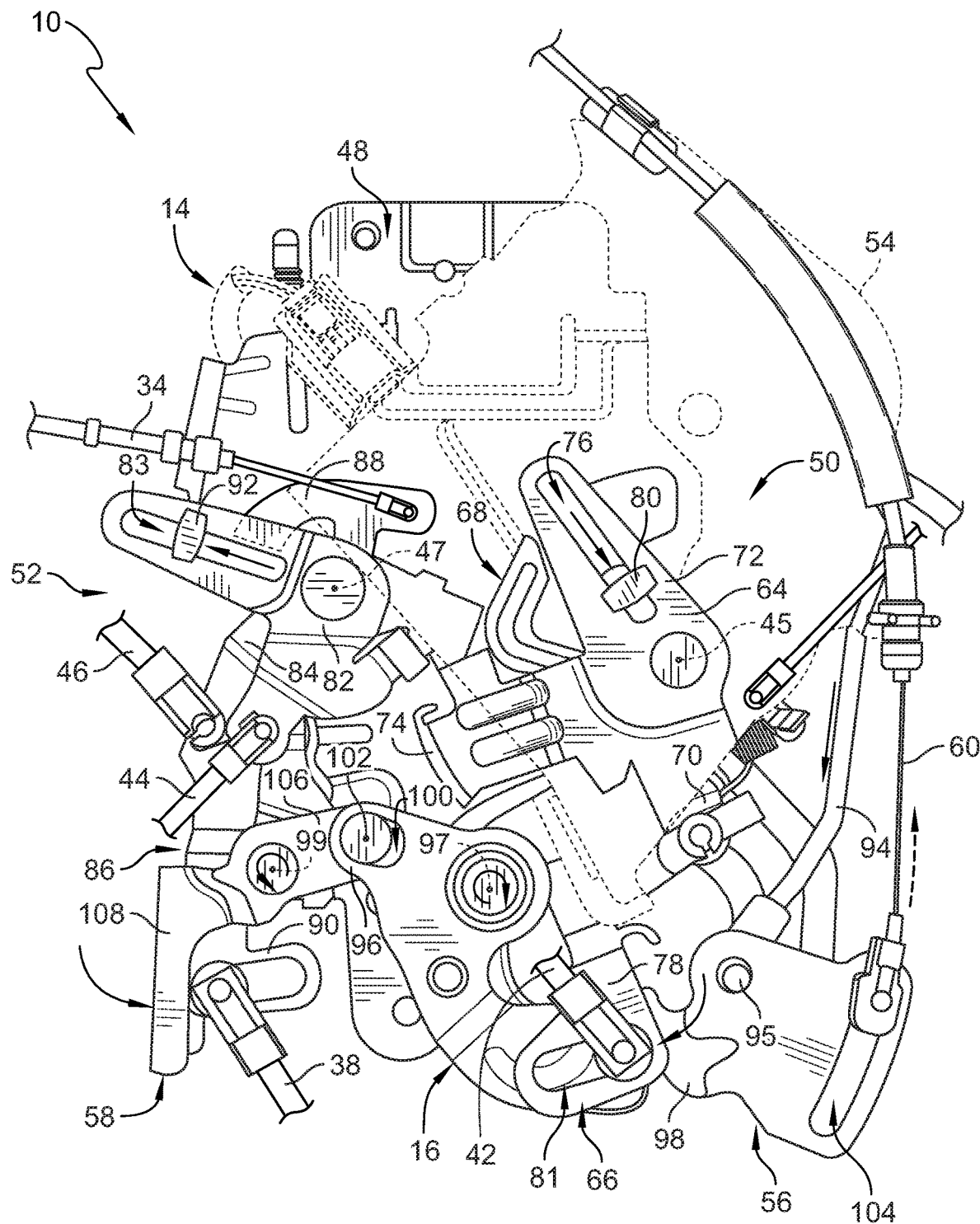
FIG. 12 is a front elevation view of the synchronizer and lock unit arranged as in FIG. 11 showing the lock unit in the locked configuration so that the first and second release assemblies are disabled and further showing no handles activated.
Figure 13:
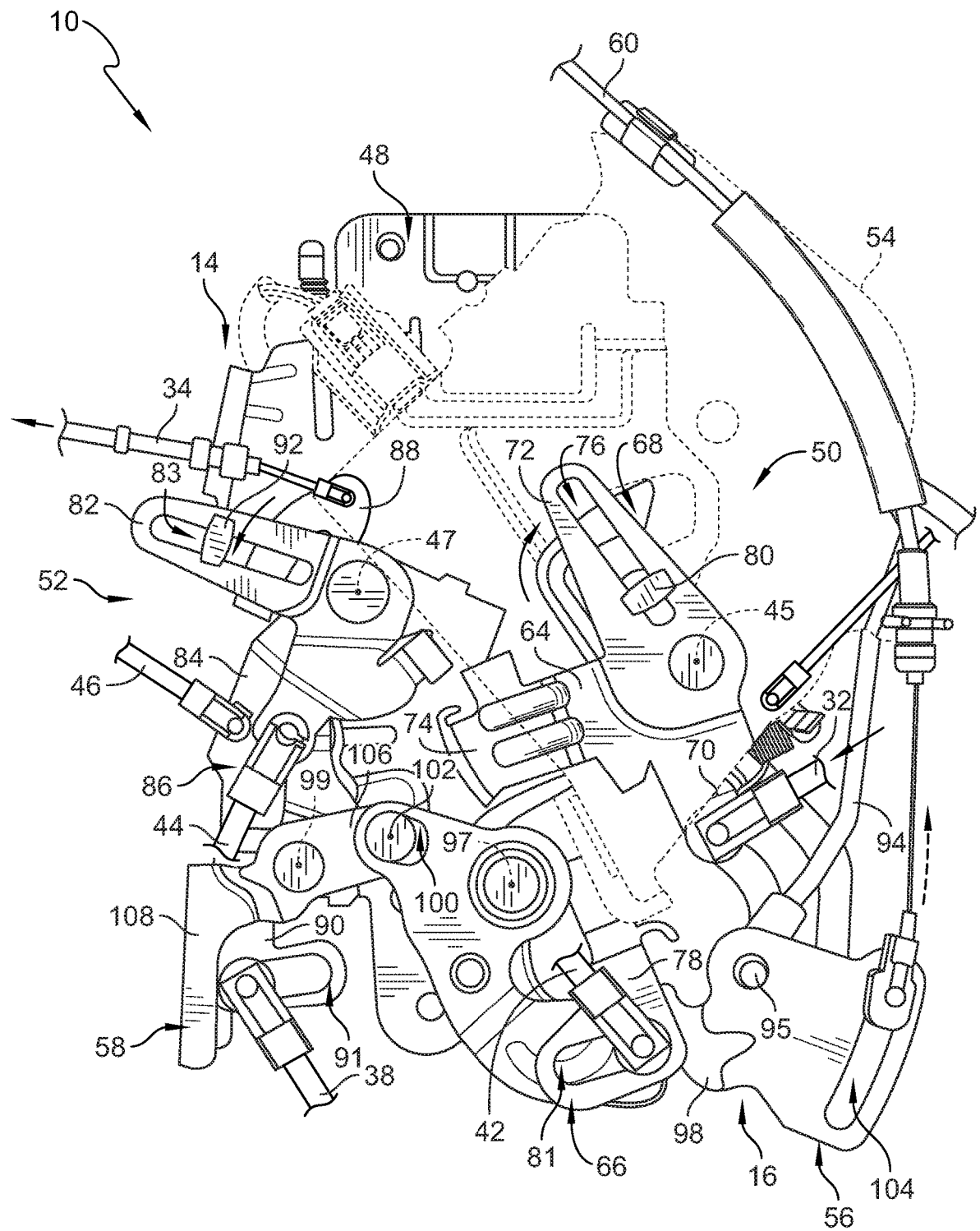
FIG. 13 is a front elevation view of the synchronizer and lock unit arranged as in FIG. 11 showing the lock unit in the locked configuration so that the first and second release assemblies are disabled and further showing the upper and lower handles of the tailgate are activated, but that the disabled first and second release assemblies of the synchronizer do not release any latches so that the tailgate remains locked and held in position relative to the body of the vehicle.

The synchronizer 14 is movable between the enabled arrangement, shown in FIGS. 3-9, and the disabled arrangement, shown in FIGS. 11-13. In the enabled arrangement, the synchronizer 14 is configured to i) release the first latch 26 and the third latch 30 in response to a user pulling the upper handle 22 to allow the tailgate 12 to rotate about the first axis 11 in the fold-down mode ii) release the second latch 28 and the third latch 30 in response to a user pulling the lower handle 24 to allow the tailgate 12 to rotate about the second axis 13 in the side-swing mode. The synchronizer 14 also blocks more than two latches of the first latch 26, the second latch 28, and the third latch 30 from being released at a given time so that the tailgate 12 may move only in either the fold-down mode or the side-swing mode when the synchronizer 14 is in the enabled arrangement. In the disabled arrangement, the synchronizer 14 allows the upper handle 22 and/or the lower handle 24 to rotate relative to the tailgate frame 20 with their full range of motion without the synchronizer 14 releasing any of the first latch 26, the second latch 28, and the third latch 30 in response to the user pulling one of the upper handle 22 and the lower handle 24 as suggested in FIGS. 11-13.

The synchronizer 14 includes a mount 48, the first release assembly 50, and the second release assembly 52 as shown in FIGS. 3-6. The mount 48 is coupled with the tailgate frame 20 in fixed position for movement with the tailgate frame 20. The first release assembly 50 is coupled with the mount 48 and unlatches the first latch 26 and the third latch 30 in response to being activated by the user pulling the upper handle 22 as suggested in FIGS. 7 and 8. The second release assembly 52 is coupled with the mount 48 and unlatches the second latch 28 and the third latch 30 in response to being activated by the user pulling the lower handle 24 as suggested in FIGS. 9 and 10.

Figure 3:
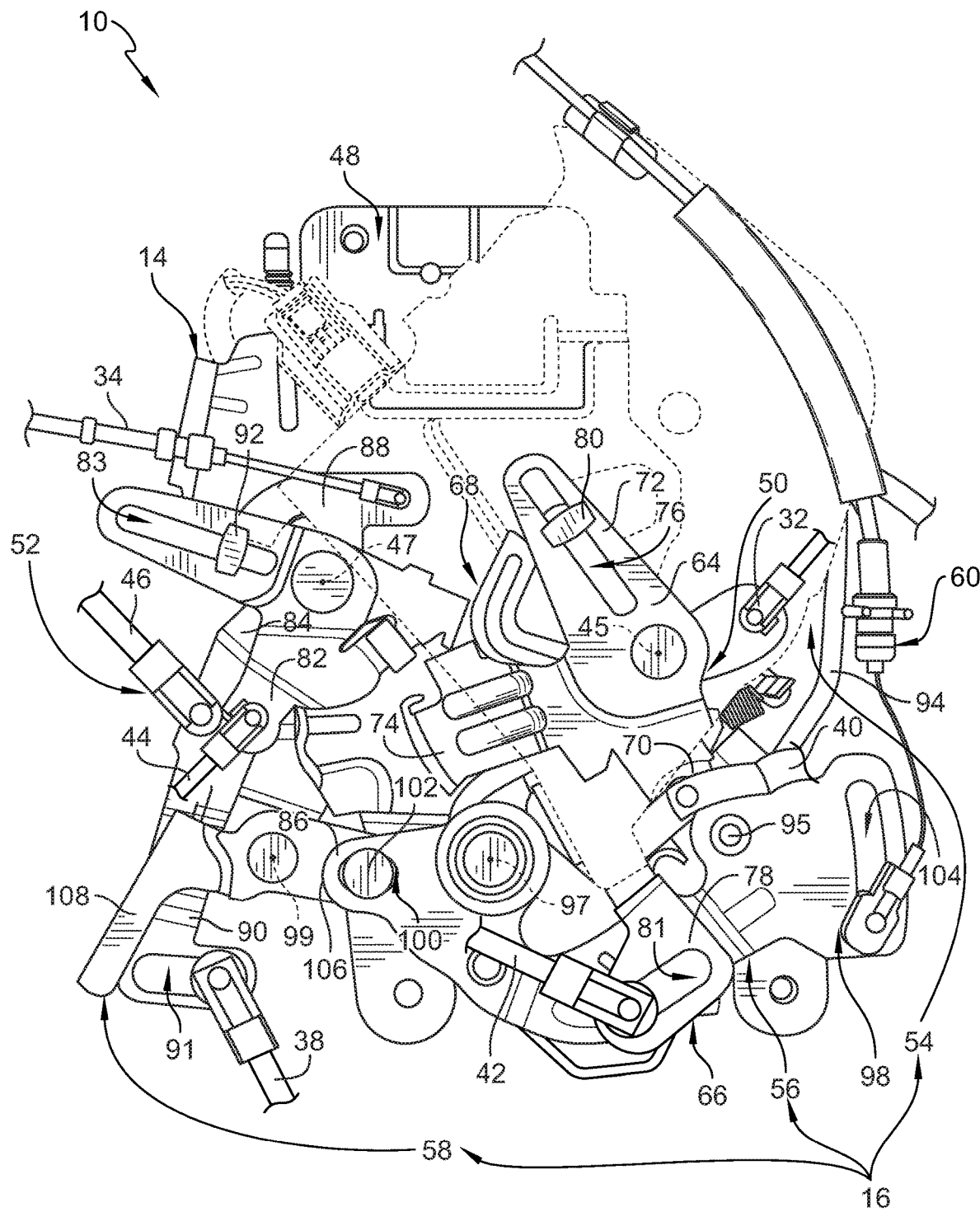
FIG. 3 is an elevation view of the synchronizer and lock unit included in the latch system of FIG. 2 showing that the lock unit includes a first clasp arm engaged with the synchronizer, a second clasp arm engaged with the synchronizer, and an actuator (in phantom) coupled with the first clasp arm and configured to move the first and second clasp arms between a locked configuration and an unlocked configuration.

The first release assembly 50 includes a first latch-actuator lever 64, a first sensor unit 66, and a first handle lever 68 as shown in FIG. 3. The first latch-actuator lever 64 is rotatably coupled with the mount 48 about a first synchronizer axis 45 and connected with the first latch 26 via the first actuator rod 40 such that rotation of the first latch-actuator lever 64 relative to the mount 48 releases the first latch 26. The first sensor unit 66 is movable between an unlocked arrangement and a locked arrangement by the lock unit 16. The first handle lever 68 is connected with the upper handle 22 via the actuator link 32 and configured to move the first latch-actuator lever 64 by applying a force to the first sensor unit 66 when the upper handle 22 is pulled and the first sensor unit 66 is in the unlocked arrangement.

Figure 6:
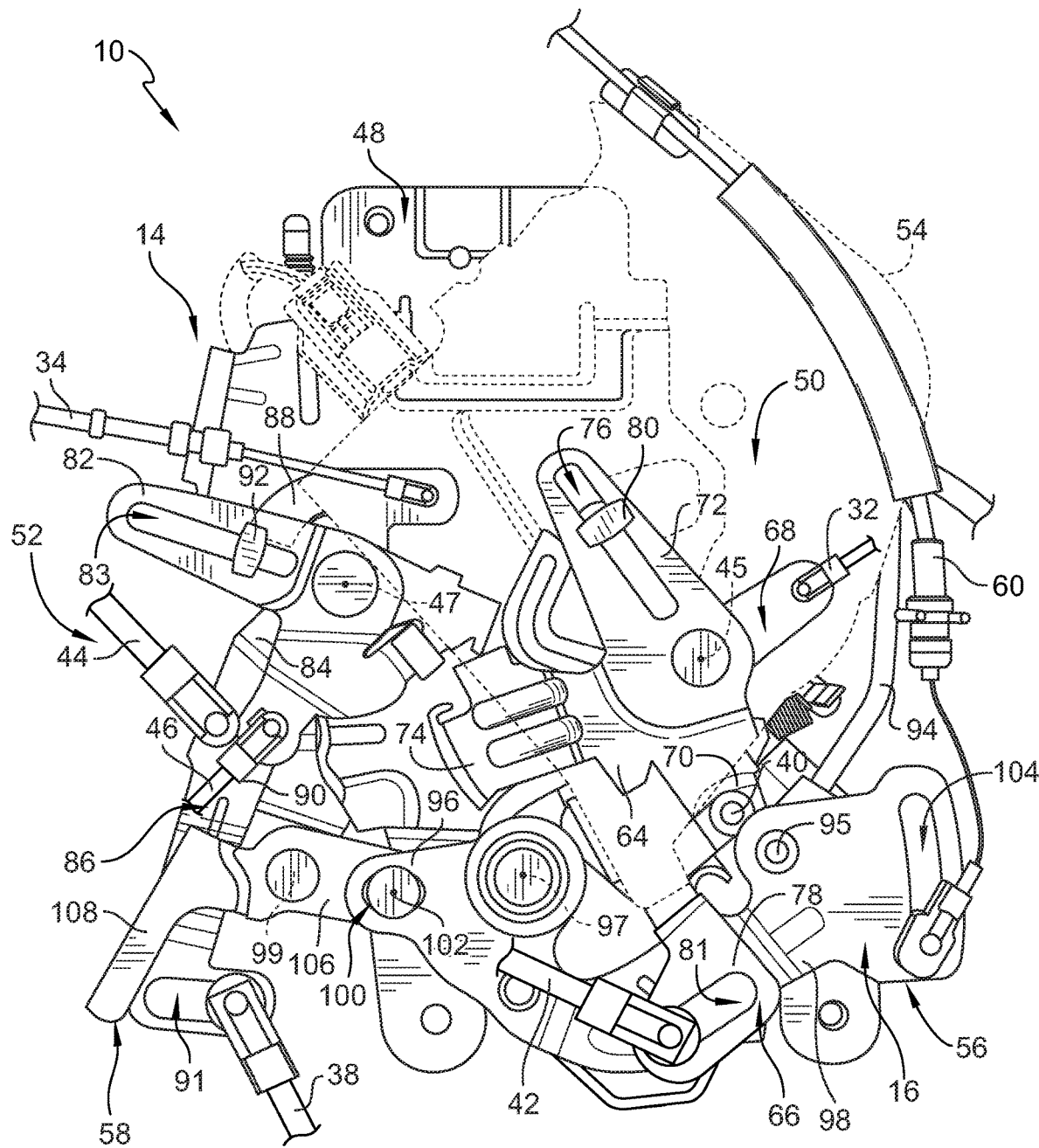
FIG. 6 is a front elevation view of the synchronizer and lock unit arranged as in FIG. 5 showing the lock unit in the unlocked configuration and the synchronizer in the enabled arrangement such that the synchronizer is capable of unlatching the dual-mode tailgate in response to one of the handles being pulled.

The first latch-actuator lever 64 is rigid and includes a first pawl 70, a second pawl 72, and a third pawl 74 as shown in FIG. 6. The first pawl 70 extends radially away from the first synchronizer axis 45 and is coupled with the first actuator rod 40 at a pivot joint. The second pawl 72 extends radially away from the first synchronizer axis 45 and is coupled with the first sensor unit 66. The second pawl 72 is formed to define a radially extending first slot 76 in the second pawl 72. The third pawl 74 extends radially away from the first synchronizer axis 45 is configured to engage and move a third latch-actuator lever 84 included in the second release assembly 52.

Figure 4:
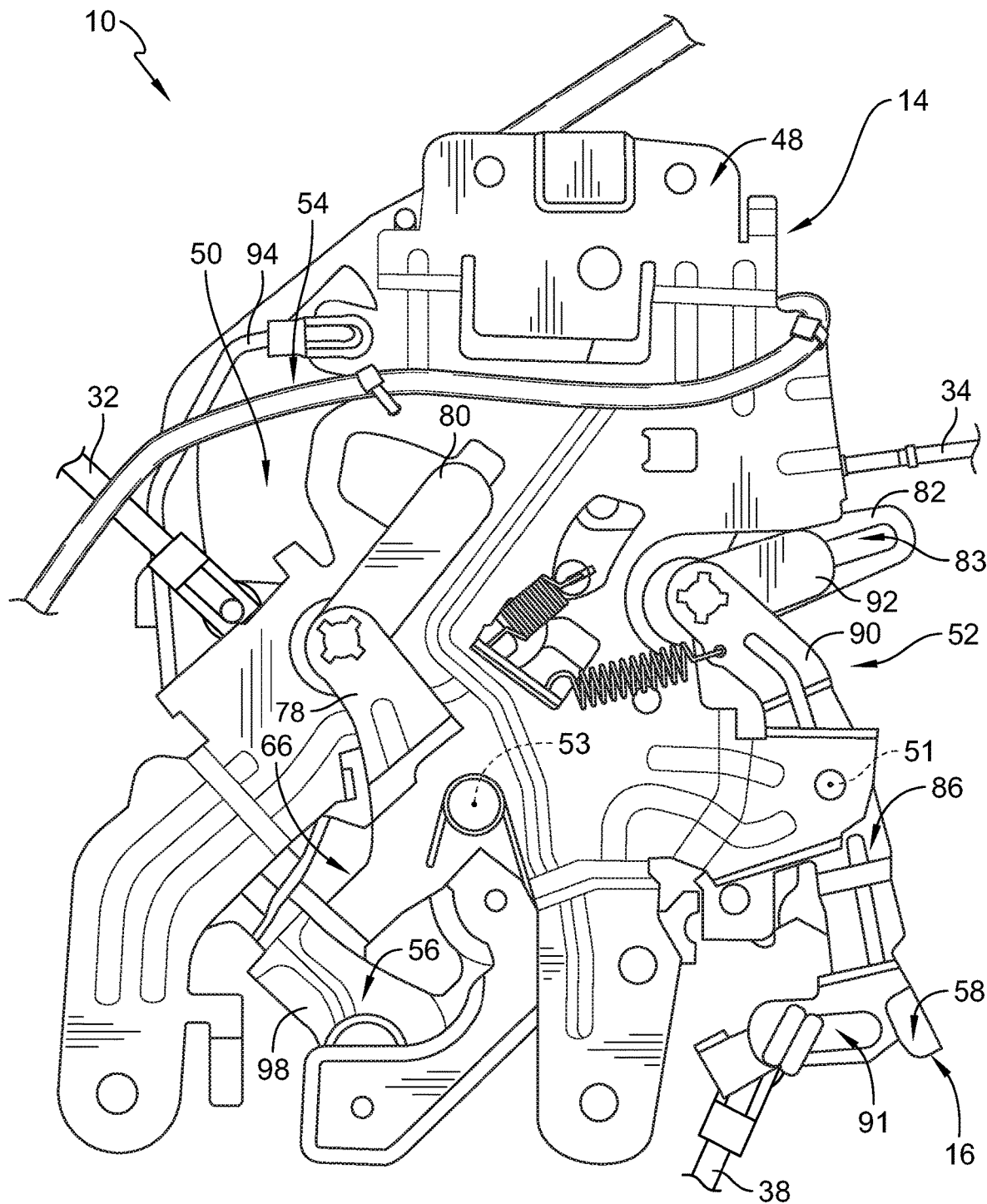
FIG. 4 is a rear elevation view of the synchronizer and lock unit of FIG. 3.

The first sensor unit 66 includes a first sensor lever 78 and a first pin 80 as shown in FIGS. 3 and 4. The first pin 80 extends into the first slot 76 and is configured to translate in the first slot 76 between an active position, shown in FIG. 6, in which the first pin 80 is engagable by the first handle lever 68 and a de-active position, shown in FIGS. 12 and 13, in which the first pin 80 is not engagable by the first handle lever 68.

The first sensor lever 78 is rotatably coupled with the mount 48 about an axis 53 and is coupled with the first pin 80 as shown in FIG. 6. The first sensor lever 78 moves the first pin 80 between the active position and the de-active position in response to rotation of the first sensor lever 78 about the first axis 53. The first sensor lever 78 is formed to define a slot 81 therein for receiving the second sensor rod 42 and allowing the second sensor rod 42 to move in the slot 81. The slot 81 allows the lock unit 16 to move between the unlocked and locked configuration without interfering with the second sensor rod 42.

The first sensor lever 78 is coupled with the second sensor rod 42 as suggested in FIGS. 3 and 5. When the synchronizer 14 is in the enabled arrangement, the first sensor lever 78 is biased to locate the first pin 80 in the active position so that pulling the upper handle 22 causes the first and third latches 26, 30 to unlatch. Also when the synchronizer 14 is in the enabled arrangement, the second sensor rod 42 rotates the first sensor lever 78 in response to the lower handle 24 being pulled so that the first sensor lever 78 moves the first pin 80 to the de-active position as shown in FIG. 10. As such, the user cannot activate the first release assembly 50 to unlatch the first latch 26 by pulling the upper handle 22 which would otherwise result in the first, second, and third latches 26, 28, 30 being unlatched at the same time.

The second release assembly 52 includes a second latch-actuator lever 82, a third latch-actuator lever 84, a second sensor unit 86, and a second handle lever 88 as shown in FIGS. 3 and 6. The second latch-actuator lever 82 is rotatably coupled with the mount 48 about a second synchronizer axis 47 and connected with the second latch 28 via the second actuator rod 44 such that rotation of the second latch-actuator lever 82 relative to the mount 48 releases the second latch 28. The third latch-actuator lever 84 is rotatably coupled with the mount 48 about the second synchronizer axis 47 and connected with the third latch 30 via the third actuator rod 46 such that rotation of the third latch-actuator lever 84 relative to the mount 48 releases the third latch 30.

The second sensor unit 86 is movable between an unlocked arrangement and a locked arrangement by the lock unit 16. The second handle lever 88 is connected with the lower handle 24 via the second actuator link 34 and configured to move the second latch-actuator lever 82 and the third latch-actuator lever 84 by applying a force to the second sensor unit 86 when the lower handle 24 is pulled and the second sensor unit 86 is in the unlocked arrangement.

The second latch-actuator lever 82 is coupled with the second actuator rod 44 at a pivot joint and is formed to define a radially extending second slot 83 as shown in FIG. 6. The second latch-actuator lever 82 is configured to engage the third latch-actuator lever 84 to rotate about the second axis 47 when the second latch-actuator lever 82 is activated as shown in FIG. 10.

The second sensor unit 86 includes a second sensor lever 90 and a second pin 92 as shown in FIGS. 3 and 4. The second pin 92 extends into the second slot 83 and is configured to translate in the second slot 83 between an active position, shown in FIG. 6, in which the second pin 92 is engagable by the second handle lever 88 and a de-active position, shown in FIGS. 12 and 13, in which the second pin 92 is not engagable by the second handle lever 88.

The second sensor lever 90 is rotatably coupled with the mount 48 about an axis 51 and is coupled with the second pin 92 as shown in FIGS. 4 and 6. The second sensor lever 90 moves the second pin 92 between the active position and the de-active position in response to rotation of the second sensor lever 90 about the second synchronizer axis 47. The second sensor lever 90 is formed to define a slot 91 therein for receiving the first sensor rod 38 and allowing the first sensor rod 38 to move in the slot 91. The slot 91 allows the lock unit 16 to move between the unlocked and locked configuration without interfering with the first sensor rod 38.

The second sensor lever 90 is coupled with the first sensor rod 38 as suggested in FIGS. 3 and 4. When the synchronizer 14 is in the enabled arrangement, the second sensor lever 90 is biased to locate the second pin 92 in the active position so that pulling the lower handle 24 causes the second and third latches 28, 30 to unlatch. Also when the synchronizer 14 is in the enabled arrangement, the first sensor rod 38 rotates the second sensor lever 90 in response to the upper handle 22 being pulled so that the second sensor lever 90 moves the second pin 92 to the de-active position as shown in FIG. 8. As such, the user cannot activate the second release assembly 52 to unlatch the second latch 28 by pulling the lower handle 24 which would otherwise result in the first, second, and third latches 26, 28, 30 being unlatched at the same time.

The lock unit 16 is configured to lock the tailgate 12 so that the tailgate 12 is held in position relative to the vehicle 5 and is not movable in the fold-down or side-swing mode. The lock unit 16 moves selectively the synchronizer 14 between the enabled and disabled arrangements. The lock unit 16 is coupled with the synchronizer 14 and configured to move selectively the synchronizer between the enabled arrangement and a disabled arrangement in which the synchronizer 14 allows the upper handle 22 and the lower handle 24 to pivot relative to the tailgate frame 20 without the synchronizer 14 releasing any of the first latch 26, the second latch 28, and the third latch 30 in response to the user pulling one of the upper handle 22 and the lower handle 24.

The lock unit 16 includes an actuator 54, a first clasp arm 56, a second clasp arm 58, and optionally a manual release 60 as shown in FIGS. 3 and 5. The first clasp arm 56 is configured to move the first release assembly 50 and maintain the first release assembly 50 in position to disable the first release assembly 50. The second clasp arm 58 is configured to move the second release assembly 52 and maintain the second release assembly 52 in position to disable the second release assembly 52. The actuator 54 is configured to move the first clasp arm 56 and the second clasp arm 58 in response to inputs to enable and disable the synchronizer 14. The inputs may include, for example, signals from a key fob or from a switch in the vehicle or from a user turning a key in a lock connected with the actuator 54. The manual release 60 is configured to move the first clasp arm 56 to move the lock unit 16 to the unlocked configuration in response to the user activating the manual release 60.

The actuator 54 is coupled with the mount 48 and includes an arm 94 that is coupled with the first clasp arm 56 at a pivot joint 95 as shown in FIGS. 3 and 6. The arm 94 is configured to move the first clasp arm 56 and cause the first clasp arm 56 to rotate about first lock axis 97 so as to move the lock unit 16 between the locked and unlocked configurations. Portions of the actuator 54 are shown in broken lines in the drawings for clarity to reveal the release assemblies 50, 52 underneath.

In the illustrative embodiment, the actuator 54 includes a motorized actuator. The motorized actuator 54 may be connected with an electric energy source and configured to activate and move the clasp arms 56, 58 in response to receiving an input from a controller. The input may be a signal from a key FOB or from a button or switch on the vehicle or on a lock. In other embodiments, the actuator 54 may comprise a manual lock cylinder. The manual lock cylinder is configured to receive a key that is turned in the lock cylinder to activate the actuator and move the first clasp arm 56 and the second clasp arm 58.

The first clasp arm 56 includes a first leg 96 that extends radially away from the axis 97 and a second leg 98 that extends radially and circumferentially away from the axis 97 as shown in FIGS. 3 and 6. The first leg 96 is formed to include a slot 100 and a pin 102 extends into the slot 100 and into the second clasp arm 58. The second leg 98 engages the first sensor lever 78. The second leg 98 further includes an optional slot 104 that receives the manual release 60 to couple the manual release 60 with the first clasp arm 56.

The actuator 54 can rotate the first clasp arm 56 in a first direction in response to receiving an input to lock the tailgate 12. Rotation of the first clasp arm 56 about the axis 97 to the locked configuration causes the second leg 98 to move and rotate the first sensor lever 78 about the axis 53 as suggested in FIGS. 12 and 13. This movement causes the pin 80 to move to the de-active position such that the synchronizer 14 is in the disabled arrangement. As a result, pulling the upper handle 22 allows the upper handle 22 to rotate, but does not unlatch the first latch 26 and the third latch 30.

The actuator 54 can rotate the first clasp arm 54 in a second direction in response to receiving an input to unlock the tailgate 12. Rotation of the first clasp arm 56 to the unlocked configuration causes second leg 98 to rotate away from the first sensor lever 78. The first sensor lever 78 is biased by a bias member to rotate about the axis 53 and remain in contact with the first clasp arm 54. This causes the pin 80 to move back to the active position.

The second clasp arm 58 includes a first leg 106 that extends radially away from a second lock axis 99 and a second leg 108 that extends radially and circumferentially away from the axis 99 as shown in FIGS. 3 and 6. The first leg 106 is formed to include a round hole and receives the pin 102 to couple the first leg 106 to the first leg 96 of the first clasp arm 56. The second leg 108 engages the second sensor lever 90.

Rotation of the first clasp arm 56 by the actuator 54 causes the second arm 58 to rotate about the axis 99 in the second direction due to the connection via pin 102. Rotation of the second clasp arm 58 about the axis 99 to the locked configuration causes the second leg 108 to move and rotate the second sensor lever 90 about the axis 51 as suggested in FIGS. 12 and 13. This movement causes the pin 92 to move to the de-active position such that the synchronizer 14 is in the disabled arrangement. As a result, pulling the lower handle 24 allows the lower handle 24 to rotate, but does not unlatch the second latch 28 and the third latch 30.

The actuator 54 can rotate the first clasp arm 56, and thus, the second clasp arm 58, in the opposite direction in response to receiving the input to unlock the tailgate 12. Rotation of the second clasp arm 58 to the unlocked configuration causes second leg 108 to rotate away from the second sensor lever 90. The second sensor lever 90 is biased by a bias member to rotate about the axis 51 and remain in contact with the second clasp arm 58. This causes the pin 92 to move back to the active position.

Illustratively, the manual release 60 is a cable system coupled with the first clasp arm 56 and with a third handle of the tailgate 12. A connector piece of the manual release 60 is free to move in the slot 104 when the lock unit 16 moves between the locked and unlocked configuration. The manual release 60 can be activated by the user when the lock unit 16 is in the locked configuration to cause the connector piece to engage the second leg 98 and cause the first clasp arm 56 and, thus, also the second clasp arm 58 to rotate and move the lock unit 16 to the unlocked configuration.

During operation, the lock unit 16 may be in the unlocked configuration to cause the synchronizer 14 to be in the enabled arrangement as shown in FIGS. 5 and 6. In the unlocked configuration, the first clasp arm 56 and the second clasp arm 58 are spread apart such that the first sensor unit 66 is biased to the unlocked arrangement and the second sensor unit 86 is biased to the unlocked arrangement as shown in FIG. 6. In this situation, the pin 80 is engagable by the first handle lever 68 of the first release assembly 50 and the pin 92 is engagable by the second handle lever 88 of the second release assembly 50. As a result, either upper handle 22 or lower handle 24 may be activated to unlock the tailgate 12 and move it in either the fold-down or side-swing mode.

With the lock unit 16 in the unlocked configuration so that the synchronizer 14 is in the enabled arrangement, the upper handle 22 can be pulled and activated in FIGS. 7 and 8 to open the tailgate in the fold-down mode. Activating the upper handle 22 causes the first actuator link 32 to rotate the first handle lever 68 of the first release assembly 50 as shown in FIG. 8. The first handle lever 68 rotates about the axis 45 and engages the pin 80 which transfers the force to the first latch-actuator lever 64. This causes the first latch-actuator lever 64 to rotate about the axis 45 which unlatches the first latch 26 via first actuator rod 40 coupled with the first latch-actuator lever 64. The third pawl 74 of the first latch-actuator lever 64 engages the third latch-actuator lever 84 and causes it to rotate about the axis 47 without rotating the second latch-actuator lever 82. Rotation of the third latch-actuator lever 84 unlatches the third latch 30 via the third actuator rod 46. As such, the first latch 26 and the third latch 30 are unlatched so that the tailgate 12 is free to move in the fold-down mode.

Unlatching the first latch 26 also causes the first sensor rod 38, (which is coupled with the first latch 26) to rotate the second sensor lever 90 of the second sensor unit 86 about the axis 51 as shown in FIG. 8. Rotation of the second sensor lever 90 causes the pin 92 to move to the de-active position so that the second handle lever 88 cannot engage the pin 92 and release the second latch 28 if the lower handle 24 is pulled. As such, the synchronizer 14 does not allow all three latches 26, 28, 30 to be unlatched at a given time.

With the lock unit 16 in the unlocked configuration so that the synchronizer 14 is in the enabled arrangement, the lower handle 24 can be pulled and activated as shown in FIGS. 9 and 10 to open the tailgate in the side-swing mode. Activating the lower handle 24 causes the second actuator link 34 to rotate the second handle lever 88 of the second release assembly 52 about the axis 47 as shown in FIG. 10. The second handle lever 88 rotates about the axis 47 and engages the pin 92 which transfers the force to the second latch-actuator lever 82. This causes the second latch-actuator lever 82 to rotate about the axis 47 which unlatches the second latch 28 via second actuator rod 44 coupled with the second latch-actuator lever 82. The second latch-actuator lever 82 engages the third latch-actuator lever 84 and causes the third latch-actuator lever 84 to rotate about the axis 47 without causing the first latch-actuator lever 64 to rotate. Rotation of the third latch-actuator lever 84 unlatches the third latch 30 via the third actuator rod 46. As such, the second latch 28 and the third latch 30 are unlatched so that the tailgate 12 is free to move in the side-swing mode.

Unlatching the second latch 28 also causes the sensor rod 42 (which is coupled with the second latch 28) to rotate the first sensor lever 78 of the first sensor unit 66 about an axis 53 as suggested in FIG. 10. Rotation of the first sensor lever 78 causes the pin 80 to move in the slot 76 to the de-active position so that the first handle lever 68 cannot engage the pin 80 and release the first latch 26 if the upper handle 22 is pulled. As such, the synchronizer 14 does not allow all three latches 26, 28, 30 to be unlatched at a given time.

The actuator 54 can receive an input from a controller, or can be manually activated by the user in some embodiments, to move the lock unit 16 from the unlocked configuration to the locked configuration as suggested in FIGS. 11-13. The synchronizer 14 is in the disabled arrangement when the lock unit 16 moves to the locked configuration. In the disabled arrangement, the synchronizer 14 allows the upper handle 22 and the lower handle 24 to rotate relative to the tailgate frame 20 without the synchronizer 14 releasing any of the first latch 26, the second latch 28, and the third latch 30 in response to the user pulling one of the upper handle 22 and the lower handle 24 while allowing the upper handle 22 and the lower handle 24 to have full range of motion.

When activated, arm 94 of actuator 54 pushes the second leg 98 and overcomes the bias force of the first sensor lever 78 to cause the first clasp arm 56 to rotate about axis 97. Rotation of the first clasp arm 56 causes rotation of the second clasp arm 58 about the axis 99 via the pin 102 overcoming the bias force of the second sensor lever 90 as the arm 58 moves.

As such, the first clasp arm 56 and the second clasp arm 58 rotate toward each other as suggested in FIG. 12 to move the first and second sensor levers 78, 90. Movement of the sensor levers 78, 90 moves the pins 80, 92 so that they cannot be engaged by the first handle lever 68 and the second handle lever 88. The first and second clasp arms 56, 58 are maintained in position until the actuator 54 or manual release 60 moves them back to their unlocked positions.

As shown in FIG. 13, with the pins 80, 92 moved to the de-active positions because the lock unit 16 is in the locked configuration, the user pulling or activating either or both of the upper handle 22 and the lower handle 24 does not result in releasing any latch 26, 28, 30. In particular, activating the upper handle 22 causes the first handle lever 68 to rotate, but it does not engage the pin 80 so the first latch-actuator lever 64 does not rotate as suggested in FIG. 13. Activating the lower handle 24 causes the second handle lever 88 to rotate, but it does not engage the pin 92 so the second latch-actuator lever 82 does not rotate.

The actuator 54 can cause arm 94 to move the first clasp arm 56 and the second clasp arm 58 to their unlocked positions to place the synchronizer 14 back into the enabled arrangement shown in FIGS. 5 and 6. Alternatively, the manual release 60 may be activated by the user to move the lock unit 16 to the unlocked configuration and the synchronizer 14 to the enabled arrangement.

The upper handle 22 and the lower handle 24 are also referred to as a first handle 22 and a second handle 24, respectively. The relative locations, upper and lower, of the handles 22, 24 are suggested in this disclosure for reference only and may be located in any feasible locations on the tailgate 12 or the vehicle 5. In some embodiments, the handles 22, 24 may be aligned with one another. In some embodiments, the handle 22 may be positioned lower to ground than the handle 24.

While the disclosure has been illustrated and described in detail in the foregoing drawings and description, the same is to be considered as exemplary and not restrictive in character, it being understood that only illustrative embodiments thereof have been shown and described and that all changes and modifications that come within the spirit of the disclosure are desired to be protected.

What is claimed is:

1. A latch system for a vehicle, the latch system comprising:
   a tailgate that includes a tailgate frame, a first latch coupled with the tailgate frame, a second latch coupled with the tailgate frame, a third latch coupled with the tailgate frame, an upper handle coupled with the tailgate frame and configured to pivot relative to the tailgate frame, and a lower handle coupled with the tailgate frame and configured to pivot relative to the tailgate frame,
   a synchronizer coupled with the tailgate and configured to block and allow release of the first latch, the second latch, and the third latch, the synchronizer having an enabled arrangement in which the synchronizer is configured to i) release the first latch and the third latch in response to a user pivoting the upper handle to allow the tailgate to rotate about a first axis, ii) release the second latch and the third latch in response to the user pivoting the lower handle to allow the tailgate to rotate about a second axis perpendicular to the first axis, and iii) block more than two latches of the first latch, the second latch, and the third latch from being released at a given time, and
   a lock unit coupled with the synchronizer and configured to move selectively the synchronizer between the enabled arrangement and a disabled arrangement in which the synchronizer allows the upper handle and the lower handle to pivot relative to the tailgate frame without the synchronizer releasing any of the first latch, the second latch, and the third latch in response to the user pivoting one of the upper handle and the lower handle, wherein the synchronizer includes a mount and a first release assembly that includes a first latch-actuator lever connected with the first latch, a first handle lever coupled with the upper handle and configured to move relative to the mount in response to the user pivoting the upper handle, and a first sensor unit that is movable between an unlocked arrangement in which the first sensor unit transmits force from the first handle lever to the first latch-actuator lever to move the first latch-actuator lever in response to the user pivoting the upper handle to release the first latch and a locked arrangement in which the first sensor unit does not transmit force from the first handle lever to the first latch-actuator lever in response to the user pivoting the upper handle, wherein the first sensor unit includes a first pin that extends through a first slot formed in the first latch-actuator lever, a first sensor lever rigidly coupled with the first pin and configured to rotate to move the first pin in the first slot, and a first sensor rod coupled between the first sensor lever and the second latch and configured to rotate the first sensor lever in response to the lower handle being pivoted, wherein the lock unit includes an actuator and a first clasp arm, the actuator is coupled with the first clasp arm and configured to rotate the first clasp arm, the first clasp arm is engaged with the first sensor lever included in the first sensor unit and configured to rotate the first sensor lever to cause the first sensor lever to move the first pin in the first slot such that the first sensor unit is in the locked position in response to rotation of the first clasp arm in a first direction by the actuator to allow the upper handle to pivot without releasing either of the first latch and the third latch.

2. The latch system of claim 1, wherein the lock unit includes a second clasp arm coupled with the first clasp arm and configured to rotate in response to rotation of the first clasp arm, and the actuator is configured to rotate the first clasp arm to move the lock unit between an unlocked configuration in which the first clasp arm and the second clasp arm cooperate to maintain the synchronizer in the enabled arrangement and a locked configuration in which the first clasp arm and the second clasp arm cooperate to maintain the synchronizer in the disabled arrangement.

3. The latch system of claim 2, wherein the lock unit includes a manual release coupled with the first clasp arm and configured to rotate the first clasp arm in response to the user activating the manual release to move the lock unit from the locked configuration to the unlocked configuration.

4. The latch system of claim 3, wherein the manual release includes a cable coupled with the tailgate frame and with the first clasp arm.

5. The latch system of claim 1, wherein the synchronizer includes a second release assembly that includes a second latch-actuator lever connected with the second latch, a second handle lever coupled with the lower handle and configured to move relative to the mount in response to the user pivoting the lower handle, and a second sensor unit that is movable between an unlocked arrangement in which the second sensor unit transmits force from the second handle lever to the second latch-actuator lever to move the second latch-actuator lever in response to the user pivoting the lower handle to release the second latch and a locked arrangement in which the second sensor unit does not transmit force from the second handle lever to the second latch-actuator lever in response to the user pivoting the upper handle.

6. The latch system of claim 5, wherein the second sensor unit includes a second pin that extends through a second slot formed in the second latch-actuator lever, a second sensor lever coupled with the second pin and configured to rotate to move the second pin in the second slot, and a second sensor rod coupled between the second sensor lever and the first latch and configured to rotate the second sensor lever in response to the upper handle being pivoted.

7. The latch system of claim 6, wherein the lock unit includes a second clasp arm engaged with the second sensor lever included in the second sensor unit and configured to rotate the second sensor lever to cause the second sensor lever to move the second pin in the second slot such that the second sensor unit is in the locked position in response to rotation of the second clasp arm in a first direction by the first clasp arm to allow the lower handle to pivot without releasing either of the second latch and the third latch.

8. The latch system of claim 1, wherein the first sensor lever is formed to include a second slot and the first sensor rod is slidably coupled with the second slot of the first sensor lever.

9. A latch system for a vehicle, the latch system comprising:
a synchronizer including a mount, a first release assembly coupled with the mount and movable relative to the mount, and a second release assembly coupled with the mount and movable relative to the mount, the first release assembly configured to release a first latch in response to activation of the first release assembly, the second release assembly configured to release a second latch in response to activation of the second release assembly, and the synchronizer configured to block activation of one of the first release assembly and the second release assembly when the other of the first release assembly and the second release assembly is already activated, and
a lock unit coupled with the synchronizer and engaged with the first release assembly and the second release assembly, the lock unit configured to block selectively activation of any of the first release assembly and the second release assembly,
wherein the first release assembly includes a first latch-actuator lever configured to be connected with the first latch such that rotation of the first latch-actuator lever relative to the mount releases the first latch, a first sensor unit movable between an unlocked arrangement and a locked arrangement, and a first handle lever i) configured to apply a force to the first latch-actuator lever through the first sensor unit to cause the first latch-actuator lever to rotate and release the first latch in response to the first sensor unit being in the unlocked arrangement and the first release assembly being activated and ii) configured to not apply the force to the first latch-actuator lever through the first sensor unit in response to the first sensor unit being in the locked arrangement and the first release assembly being activated, and the lock unit is configured to move selectively the first sensor unit between the unlocked arrangement and the locked arrangement,
wherein the first sensor unit includes a first pin, a first sensor lever, and a first sensor rod, the first pin extends into the first slot formed in the latch-actuator lever and is configured to translate in the first slot between a first position in which the first pin is engagable by the first handle lever and a second position in which the first pin is not engagable by the first handle lever, the first sensor lever is pivotably coupled with the mount and coupled with the first pin and configured to move the first pin between the first position and the second position, and the first sensor rod is coupled with the first sensor lever and the second latch and configured to rotate the first sensor lever, and wherein the lock unit is movable between a locked configuration and an unlocked configuration and includes a first clasp arm and a second clasp arm, the first clasp arm blocks activation of the first release assembly and the second clasp arm blocks activation of the second release assembly in response to the lock unit being in the locked configuration, and the first clasp arm allows activation of the first release assembly and the second clasp arm allows activation of the second release assembly in response to the lock unit being in the unlocked configuration, wherein the lock unit is configured to selectively move the first sensor lever between the locked arrangement and the unlocked arrangement, wherein the first clasp arm is engaged with the first sensor lever included in the first sensor unit and configured to rotate the first sensor lever to cause the first sensor lever to move the first pin in the first slot such that the first sensor unit is in the locked position in response to rotation of the first clasp arm.

10. The latch system of claim 9, wherein the first clasp arm is rotatably coupled with the mount, the second clasp arm is rotatably coupled with the mount, and the first clasp arm is coupled with the second clasp arm such that rotation of the first clasp arm relative to the mount causes rotation of the second clasp arm.

11. The latch system of claim 9, wherein the lock unit further includes an electric actuator configured to rotate the first clasp arm in response to receiving an input to move the lock unit between the locked configuration and the unlocked configuration.

12. The latch system of claim 11, wherein the lock unit further includes a manual release coupled with the first clasp arm and configured to rotate the first clasp arm relative to the mount to move the lock unit from the locked configuration to the unlocked configuration in response to a user manually activating the manual release.

13. The latch system of claim 9, wherein the second release assembly includes a second latch-actuator lever configured to be connected with the second latch such that rotation of the second latch-actuator lever relative to the mount releases the second latch, a second sensor unit movable between an unlocked arrangement and a locked arrangement, and a second handle lever i) configured to apply a force to the second latch-actuator lever through the second sensor unit to cause the second latch-actuator lever to rotate and release the second latch in response to the second sensor unit being in the unlocked arrangement and the second release assembly being activated and ii) configured to not apply the force to the second latch-actuator lever through the second sensor unit in response to the second sensor unit being in the locked arrangement and the second release assembly being activated, and the lock unit is configured to move selectively the second sensor unit between the unlocked arrangement and the locked arrangement simultaneously with movement of the first sensor unit between the unlocked arrangement and the locked arrangement.

14. The latch system of claim 9, wherein the first clasp arm has a first leg that extends radially from a first axis and a second leg that extends radially and circumferentially away from the first axis and engages the first release assembly, and the second clasp arm has a first leg that extends radially away from a second axis and coupled with the first leg of the first clasp arm at a pivot joint and a second leg that extends radially and circumferentially away from the second axis and engages the second release assembly.

15. The latch system of claim 13, wherein the second sensor unit includes a second pin that extends through a second slot formed in the second latch-actuator lever, a second sensor lever coupled with the second pin and configured to rotate to move the second pin in the second slot, and a second sensor rod coupled between the second sensor lever and the first latch and configured to rotate the second sensor lever.

16. The latch system of claim 15, wherein the second clasp arm is engaged with the second sensor lever included in the second sensor unit and configured to rotate the second sensor lever to cause the second sensor lever to move the second pin in the second slot such that the second sensor unit is in the locked position in response to rotation of the second clasp arm.

17. The latch system of claim 9, wherein the first sensor lever is formed to include a second slot and the first sensor rod is slidably coupled with the second slot of the first sensor lever.

* * * * *